US011175715B2

(12) United States Patent
Wang

(10) Patent No.: US 11,175,715 B2
(45) Date of Patent: Nov. 16, 2021

(54) METHOD OF SUPPLYING ELECTRIC POWER TO A COMPUTER SYSTEM

(71) Applicant: MITAC COMPUTING TECHNOLOGY CORPORATION, Taoyuan (TW)

(72) Inventor: Chi-Yu Wang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 0 days.

(21) Appl. No.: 17/131,330

(22) Filed: Dec. 22, 2020

(65) Prior Publication Data

US 2021/0191492 A1    Jun. 24, 2021

(30) Foreign Application Priority Data

Dec. 24, 2019    (TW) .................................. 108147424

(51) Int. Cl.
*G06F 1/26*    (2006.01)
*G06F 1/3206*    (2019.01)
*G06F 1/3287*    (2019.01)
*G06F 1/3296*    (2019.01)

(52) U.S. Cl.
CPC .......... *G06F 1/3206* (2013.01); *G06F 1/3287* (2013.01); *G06F 1/3296* (2013.01)

(58) Field of Classification Search
CPC ..... G06F 1/3206; G06F 1/3287; G06F 1/3296
See application file for complete search history.

(56) References Cited

U.S. PATENT DOCUMENTS

2018/0375421 A1    12/2018  Mauri
2019/0069437 A1    2/2019   Adrian et al.

OTHER PUBLICATIONS

Search Report appended to an Office Action, which was issued to Taiwanese counterpart application No. 108147424 by the TIPO dated Nov. 16, 2020 with an English translation thereof.

*Primary Examiner* — Nitin G Patel
(74) *Attorney, Agent, or Firm* — Lewis Roca Rothgerber Christie LLP

(57) ABSTRACT

A method of supplying electric power to a computer system compliant with specification provided by the OCP is provided. The method includes: a PLU setting an OCP_V3_EN signal to a high level so as to make the computer system operate in a first mode; a BMC obtaining card data from an OCP card when the computer system operates in the first mode; the BMC determining whether standby power provided by a PSU in the first mode is sufficient according to the card data; and when it is determined that the standby power is not sufficient, the BMC controlling the PLU to make the computer system operate in a second mode requiring more electric power, and to then control the PSU to provide main power that is greater than the standby power to the OCP card.

19 Claims, 8 Drawing Sheets

METHOD OF SUPPLYING ELECTRIC POWER TO A COMPUTER SYSTEM

CROSS-REFERENCE TO RELATED APPLICATION

This application claims priority to Taiwanese Invention Patent Application No. 108147424, filed on Dec. 24, 2019.

FIELD

The disclosure relates to a method of supplying electric power to a computer system, and more particularly to a method of supplying electric power to a computer system in a standby state.

BACKGROUND

In a conventional computer system (e.g., a server), a power supply unit is configured to provide standby power having a voltage of 12 V and an electric current between 1.5 A and 2 A when the conventional server operates in a standby mode. Such standby power is sufficient for the conventional server to operate in the standby mode. Specifically, of the 1.5-2 A of electric current, 0.5 A is for a fan and 1 A is for general components (e.g., a platform control hub, a baseboard management controller, a physical transceiver for Gigabit Ethernet, etc.). However, new interfaces and devices for a computer system continue to be released, and the conventional configuration of a power supply unit is no longer adequate for some newly-designed computer systems. For example, a computer system compliant with specification provided by the Open Compute Project (OCP) (e.g., OCP v3.0) may additionally need an electric current of 1.5 A in the standby mode, besides the 0.5 A for a fan and the 1 A for general components. Accordingly, a computer system compliant with OCP v3.0 needs standby power of 12 V and 3 A, and the power supply unit configured for the conventional computer system is not adequate for a computer system compliant with OCP v3.0.

SUMMARY

Therefore, an object of the disclosure is to provide a method of supplying electric power to a computer system.

According to the disclosure, a method of supplying electric power to a computer system that is compliant with specification provided by the Open Compute Project (OCP) is provided. The computer system is configured to first operate in a first mode and then, when the computer system enters a standby state, in a second mode that requires more electric power than the first mode. The computer system includes a baseboard management controller (BMC), an OCP card, a programmable logic unit (PLU) that is electrically connected to the BMC and the OCP card, and a power supply unit (PSU) that supplies electric power to the BMC, the OCP card and the PLU. The method includes steps of:

setting, by the PLU, a card-activating signal (OCP_V3_EN) to a high level so as to make the computer system operate in the first mode, the card-activating signal (OCP_V3_EN) being related to activation of the OCP card;

obtaining, by the BMC, card data that is related to the OCP card from the OCP card when the computer system operates in the first mode;

determining, by the BMC, whether standby power provided by the PSU in the first mode is sufficient according to the card data;

transmitting, by the BMC, a trigger signal to the PLU when it is determined that the standby power is not sufficient; and by the PLU, upon receiving the trigger signal, making the computer system operate in the second mode, and controlling the PSU to provide main power that is greater than the standby power to the OCP card when the computer system operates in the second mode.

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Figure 1:
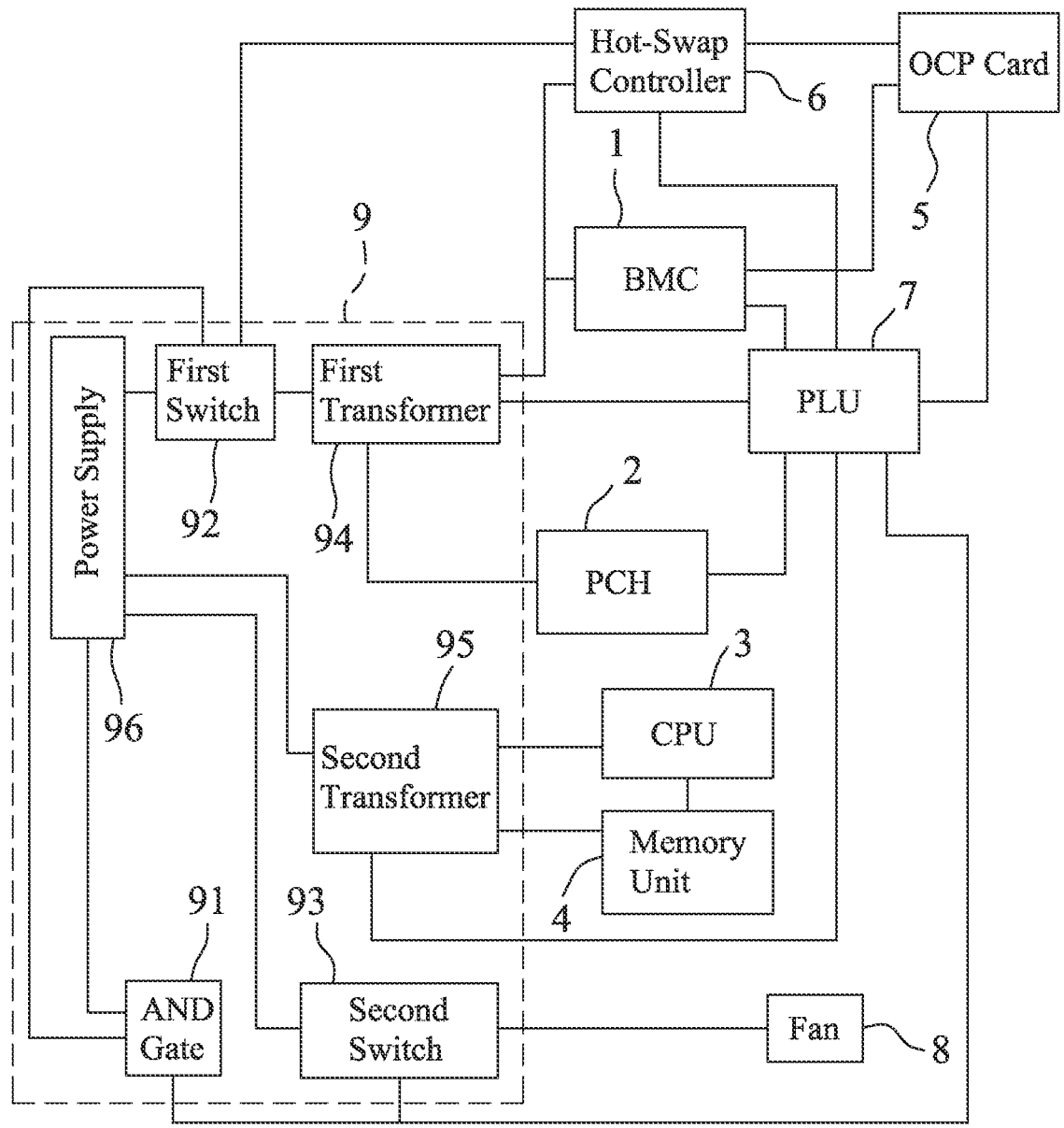
FIG. 1 is a block diagram of a computer system according to an embodiment of this disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer system compliant with specifications provided by the Open Compute Project (OCP) is configured to implement a method of supplying electric power according to an embodiment of this disclosure. The computer system is, for example, a server, and includes a baseboard management controller (BMC) 1, a platform control hub (PCH) 2, a central processing unit (CPU) 3, a memory unit 4 (e.g., a dual in-line memory module (DIMM)), an OCP card 5, a hot-swap controller 6, a programmable logic unit (PLU) 7 (e.g., a complex programmable logic device (CPLD)), a fan 8 and a power supply unit (PSU) 9. For example, the OCP card 5 is an OCP NIC 3.0 card that supports version 3.0 of the OCP specification (OCP v3.0).

The BMC 1 is electrically connected to the OCP card 5, the hot-swap controller 6, the PLU 7 and the PSU 9. The PCH 2 is electrically connected to the PLU 7 and the PSU 9. The CPU 3 is electrically connected to the memory unit 4 and the PSU 9. The memory unit 4 is electrically connected further to the PSU 9. The OCP card 5 is electrically connected further to the hot-swap controller 6 and the PLU 7. The hot-swap controller 6 is electrically connected further to the PLU 7 and the PSU 9. The PSU 9 is electrically connected further to the PLU 7 and the fan 8.

In this embodiment, the PSU 9 includes an AND gate 91, a first switch 92 electrically connected to the AND gate 91, a second switch 93, a first transformer 94 electrically connected to the first switch 92, a second transformer 95, and a power supply 96 electrically connected to the AND gate 91, the first switch 92, the second switch 93 and the second transformer 95. Specifically, the BMC 1 and the PCH 2 are electrically connected to the first transformer 94 of the PSU 9; the CPU 3 and the memory unit 4 are electrically connected to the second transformer 95 of the PSU 9; the hot-swap controller 6 is electrically connected to the first switch 92 and the first transformer 94 of the PSU 9; the PLU 7 is electrically connected to the AND gate 91, the second switch 93, the first transformer 94 and the second transformer 95 of the PSU 9; and the fan 8 is electrically connected to the second switch 93 of the PSU 9. For example, each of the first and second switches 92, 93 is a field-effect transistor (FET) switch.

When the computer system compliant with the specification provided by the OCP enters a standby state, the computer system first operates in a first mode (ID mode according to OCP specification) with standby power provided by the PSU 9 and then, when the standby power is insufficient, operates in a second mode (AUX power mode according to OCP specification) that requires more electric power than the first mode. It should be noted that, in the standby state, the BMC 1 is supplied with electric power and the computer system is not booting yet (i.e., a power button (not shown) of the computer system has not been pressed yet). Specifically, when the computer system operates in the ID mode, a first voltage signal (+3.3V_EDGE) is provided to the OCP card 5, and the OCP card 5 only allows the BMC 1 to access a field replace unit (FRU) and a scan chain (i.e., a point-to-point bus) (not shown) of the OCP card 5. When the computer system operates in the AUX power mode, the first voltage signal (+3.3V_EDGE) and a second voltage signal (+12V_EDGE) are both provided to the OCP card 5. When the computer system is booting, the computer system operates in a third mode (Main power mode according to OCP specification), in which the OCP card 5 operates in full capacity.

The method of supplying electric power to the computer system is described in the following. According to some embodiments of this disclosure, the method of supplying electric power includes a first procedure to supply electric power to the computer system in the first mode, a second procedure to supply electric power to the computer system in the second mode, and a third procedure to supply electric power to the computer system in the third mode.

Figure 2:
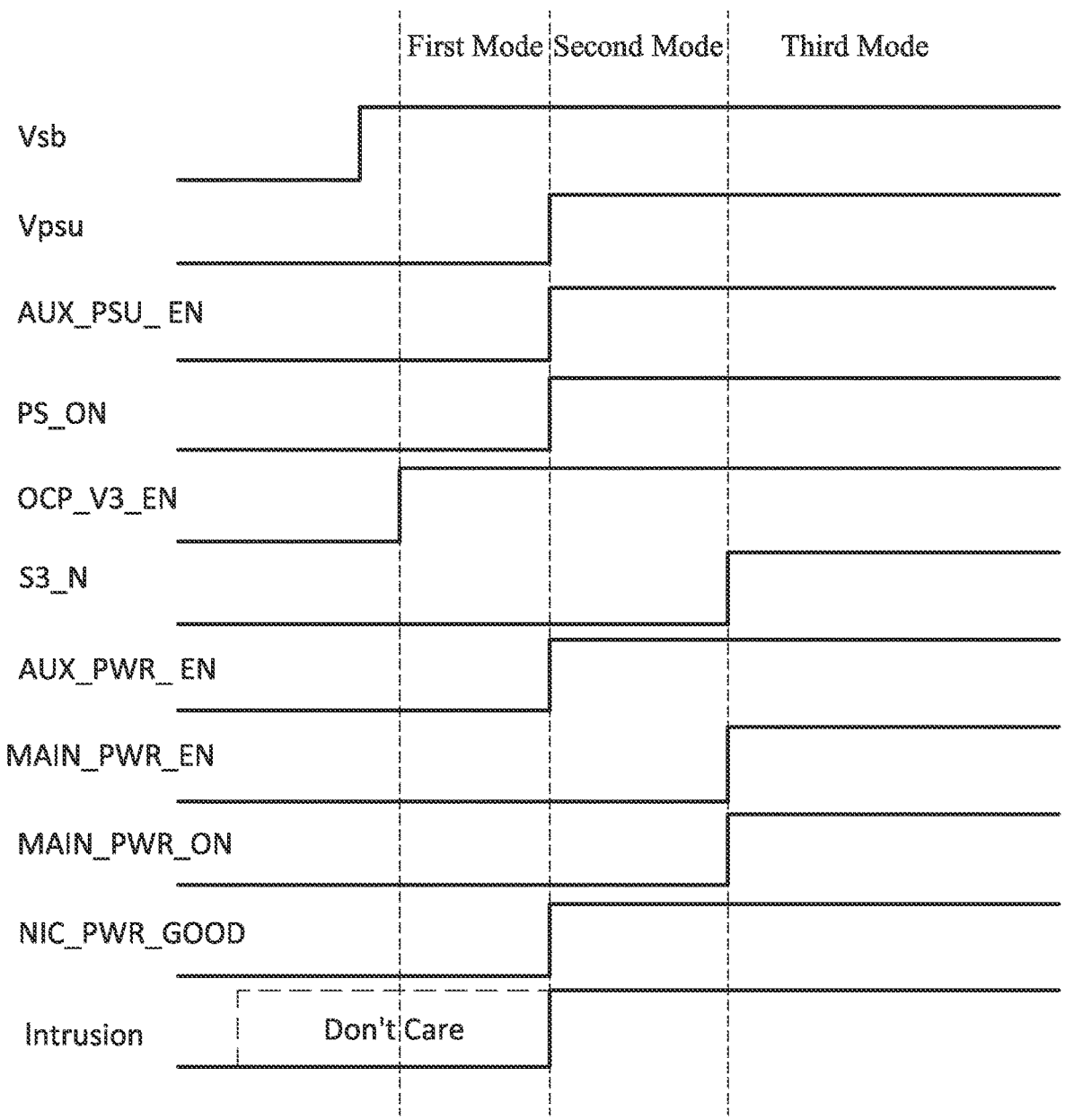
FIG. 2 is a timing diagram illustrating states of various signals in different modes.

FIG. 2 illustrates voltage signals (Vsb, Vpsu) provided by the power supply 96, and states of signals outputted by the PLU 7, the PCH 2, the OCP card 5 and the AND gate 91 in the first, second and third modes. Specifically, the voltage signal (Vsb) (hereinafter referred to as "standby voltage signal") is the voltage of the standby power outputted by the power supply 96, and the voltage signal (Vpsu) (hereinafter referred to as "main voltage signal") is the voltage of main power outputted by the power supply 96.

The PLU 7 is configured to output a pre-activating signal (AUX_PSU_EN), a card-activating signal (OCP_V3_EN), a standby-power supplying signal (AUX_PWR_EN), a main-power supplying signal (MAIN_PWR_EN) and a main-power signal (MAIN_PWR_ON). The pre-activating signal (AUX_PSU_EN) is outputted to the AND gate 91 and is related to activation of the main power in advance. The card-activating signal (OCP_V3_EN) is outputted to the hot-swap controller 6 and is related to activation of the OCP card 5. The standby-power supplying signal (AUX_PWR_EN) is outputted to the OCP card 5 and the second switch 93, and is related to supply of the standby power; the OCP card 5 enables certain functions that should be enabled in the AUX power mode when the standby-power supplying signal (AUX_PWR_EN) is set to a high level notifying the OCP card 5 that the computer system is in the AUX power mode, and disables these certain functions when otherwise. The main-power supplying signal (MAIN_PWR_EN) is outputted to the OCP card 5, and is related to supply of the main power; the OCP card 5 enables certain functions that should be enabled in the main power mode when the main-power supplying signal (MAIN_PWR_EN) is set to a high level notifying the OCP card 5 that the computer system is in the main power mode, and disables these certain functions when otherwise. The main-power signal (MAIN_PWR_ON) is outputted to the second transformer 95 and indicates whether to supply the main power.

The AND gate 91 is configured to output a power-supply signal (PS_ON) indicating whether to supply the main power based on the pre-activating signal (AUX_PSU_EN) and an intrusion signal (Intrusion) as inputs thereof. The intrusion signal indicates whether a cover plate (not shown) of the computer system (server) is removed. Specifically, the intrusion signal is high when the cover plate is not removed and is low when the cover plate is removed. The PCH 2 is configured to output a state signal (S3_N) indicating whether or not the computer system is booting/rebooting. The OCP card 5 is configured to output a power-state signal (NIC_PWR_GOOD) indicating whether the electric power supplied to the OCP card 5 is stable.

Figure 3:
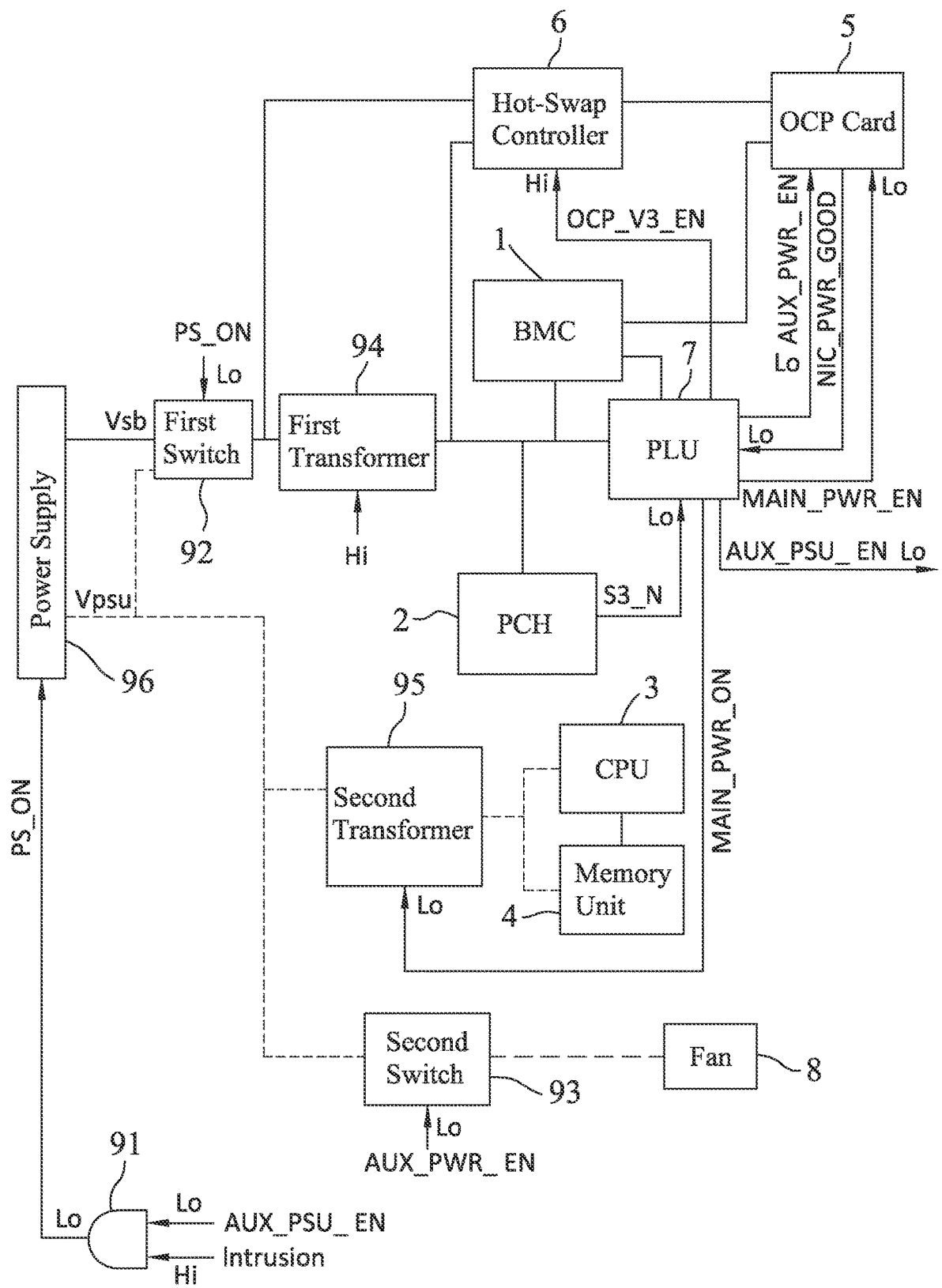
FIG. 3 is a block diagram of the computer system for illustrating states of the signals in a first mode in a standby state.
Figure 4:
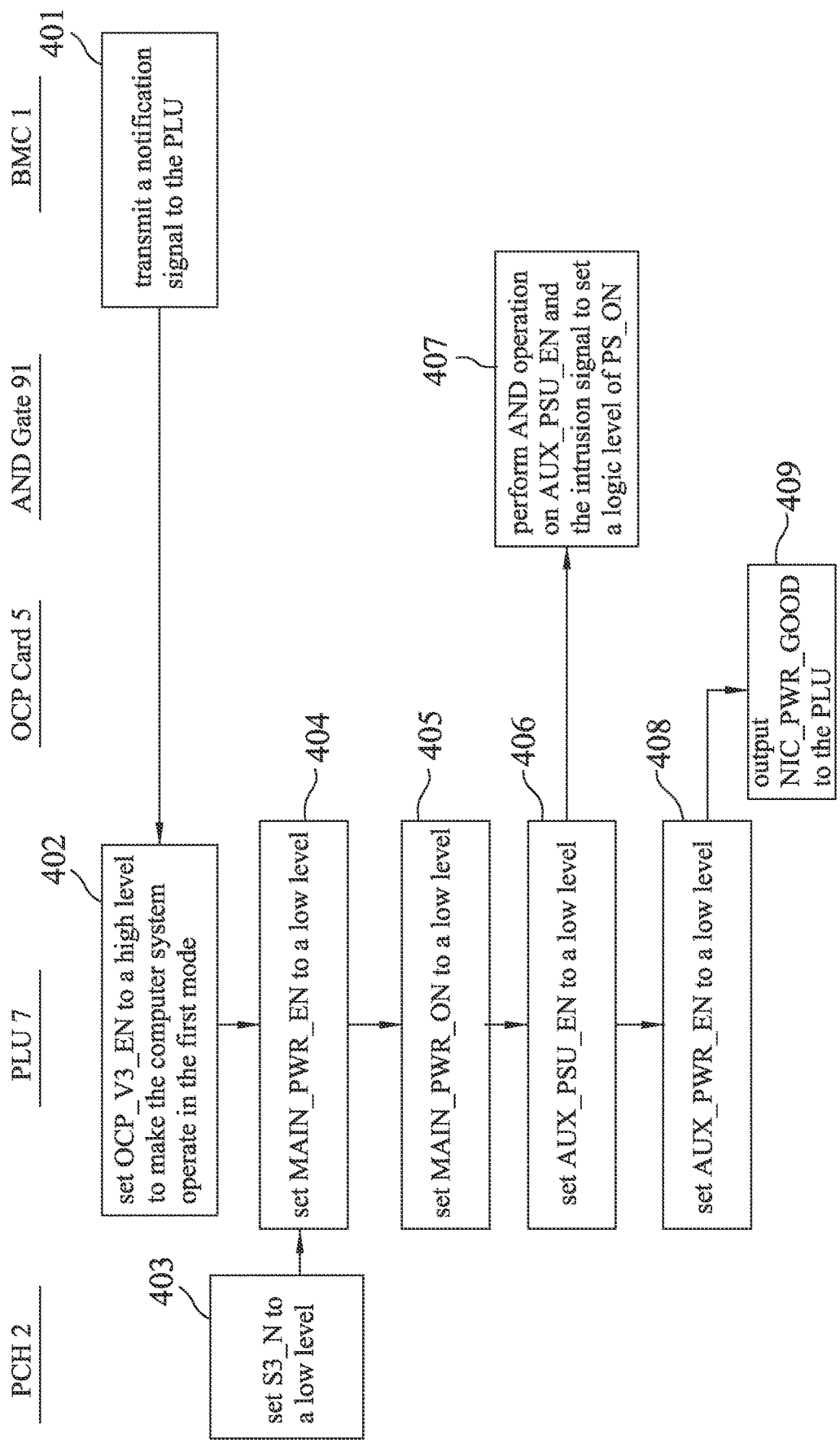
FIG. 4 is a flow chart of a first procedure of a method of supplying electric power to the computer system in the first mode.

Referring to FIGS. 3 and 4, the first procedure of the method of supplying electric power to the computer system in the first mode (ID mode) includes steps 401-409.

In step 401, the BMC 1 transmits a notification signal to the PLU 7 when the BMC 1 detects that the computer system includes an OCP card 5.

In step 402, the PLU 7 sets the card-activating signal (OCP_V3_EN) to a high level indicating that the OCP card 5 is activated, and then transmits the card-activating signal (OCP_V3_EN) to the hot-swap controller 6 so as to make the computer system operate in the first mode.

In step 403, the PCH 2 sets the state signal (S3_N) to a low level indicating that the computer system is not booting yet, and then transmits the state signal (S3_N) to the PLU 7.

In step 404, upon receiving the state signal (S3_N), the PLU 7 sets the main-power supplying signal (MAIN_PWR_EN) to a low level and then transmits the main-power supplying signal (MAIN_PWR_EN) to the OCP card 5 in response to the state signal (S3_N) at the low level.

In step 405, the PLU 7 further sets the main-power signal (MAIN_PWR_ON) to a low level and then transmits the main-power signal (MAIN_PWR_ON) to the second transformer 95 in response to the state signal (S3_N) being at the low level. In response to the main-power signal (MAIN_PWR_ON) being at the low level, the second transformer 95 does not provide the main power to the CPU 3 and the memory unit 4 (i.e., not providing the main voltage signal (Vpsu) to the CPU 3 and the memory unit 4).

In step 406, when the computer system is in the first mode, the PLU 7 further sets the pre-activating signal (AUX_PSU_EN) to a low level indicating that the main power is not to be activated and transmits the pre-activating signal (AUX_PSU_EN) to the AND gate 91.

In step 407, the AND gate 91 performs AND operation on the pre-activating signal (AUX_PSU_EN) and the intrusion signal so as to set a logic level of the power-supply signal (PS_ON), and transmits the power-supply signal (PS_ON) to the power supply 96 and the first switch 92. When the computer system is in the first mode (the pre-activating signal (AUX_PSU_EN) is low) and the cover plate of the computer system (server) is not removed (the intrusion signal is high), the AND gate 91 outputs the power-supply signal (PS_ON) having a low level so the main power is not activated. Specifically, in response to receipt of the power-supply signal (PS_ON) at the low level, the power supply 96 only outputs the standby power (i.e., Vsb=12V, Vpsu=0V), and the first switch 92 is triggered to provide the standby voltage signal (Vsb) to the first transformer 94 and the hot-swap controller 6 so as to supply electric power (i.e., the standby power) to the BMC 1, the PCH 2, the PLU 7, the hot-swap controller 6 and the OCP card 5.

In step 408, when the computer system is in the first mode, the PLU 7 further sets the standby-power supplying signal (AUX_PWR_EN) to a low level, and transmits the standby-power supplying signal (AUX_PWR_EN) to the OCP card 5 and the second switch 93. In response to receipt of the standby-power supplying signal (AUX_PWR_EN) at the low level, the second switch 93 is turned off so as to not electrically connect the power supply 96 to the fan 8, and no electric power is provided to the fan 8.

In step 409, upon receiving the standby-power supplying signal (AUX_PWR_EN) at the low level, the OCP card 5 outputs the power-state signal (NIC_PWR_GOOD) to the PLU 7. At this time, the OCP card 5 may set the power-state signal (NIC_PWR_GOOD) to a low level indicating that the electric power supplied to the OCP card 5 is not stable.

It should be noted that steps 404-409 does not have to be implemented in the specific order as shown in FIG. 4, and may be implemented simultaneously or implemented in any order according to requirement.

Figure 5:
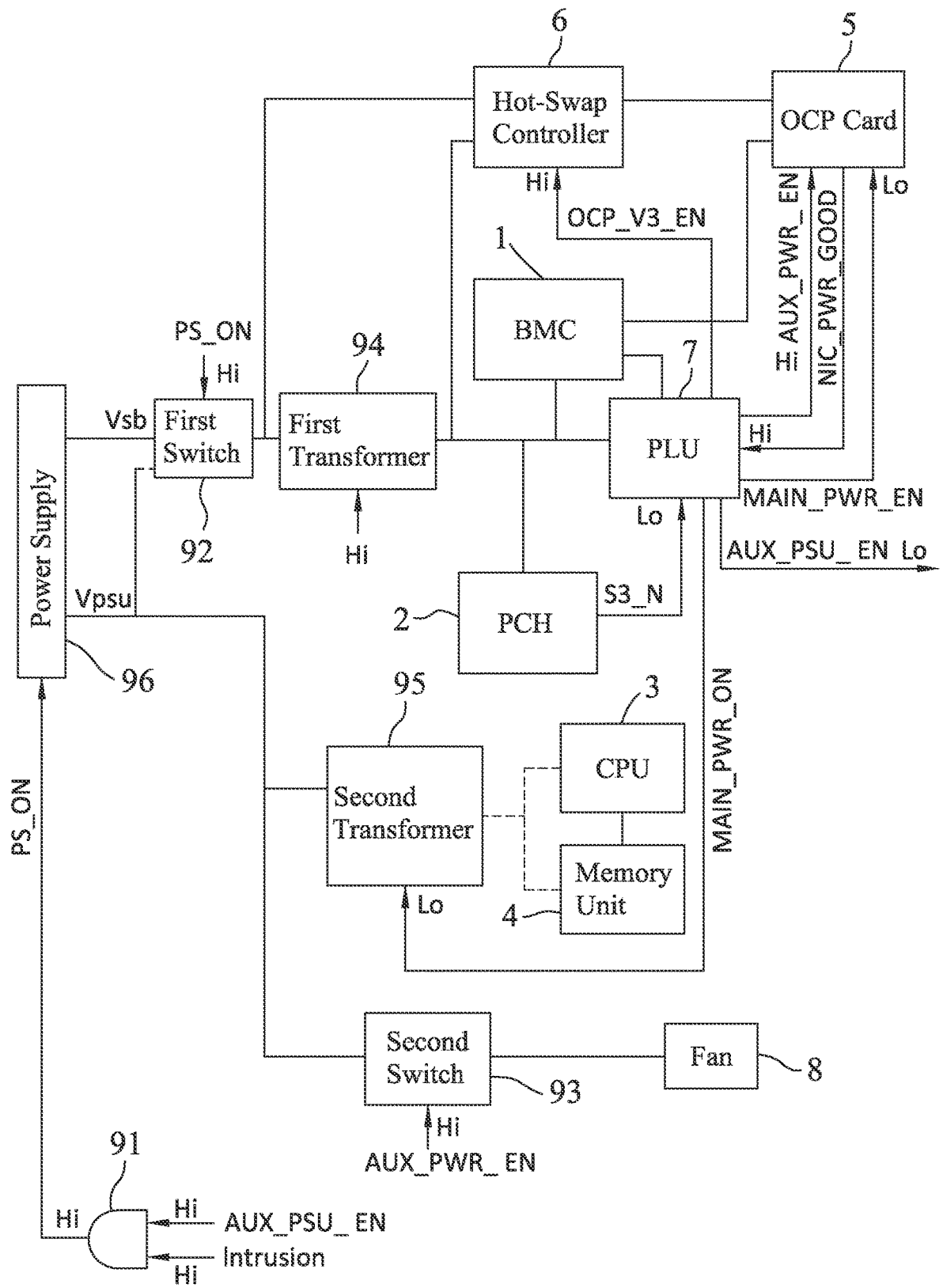
FIG. 5 is a block diagram of the computer system for illustrating states of the signals in a second mode in the standby state.
Figure 6:
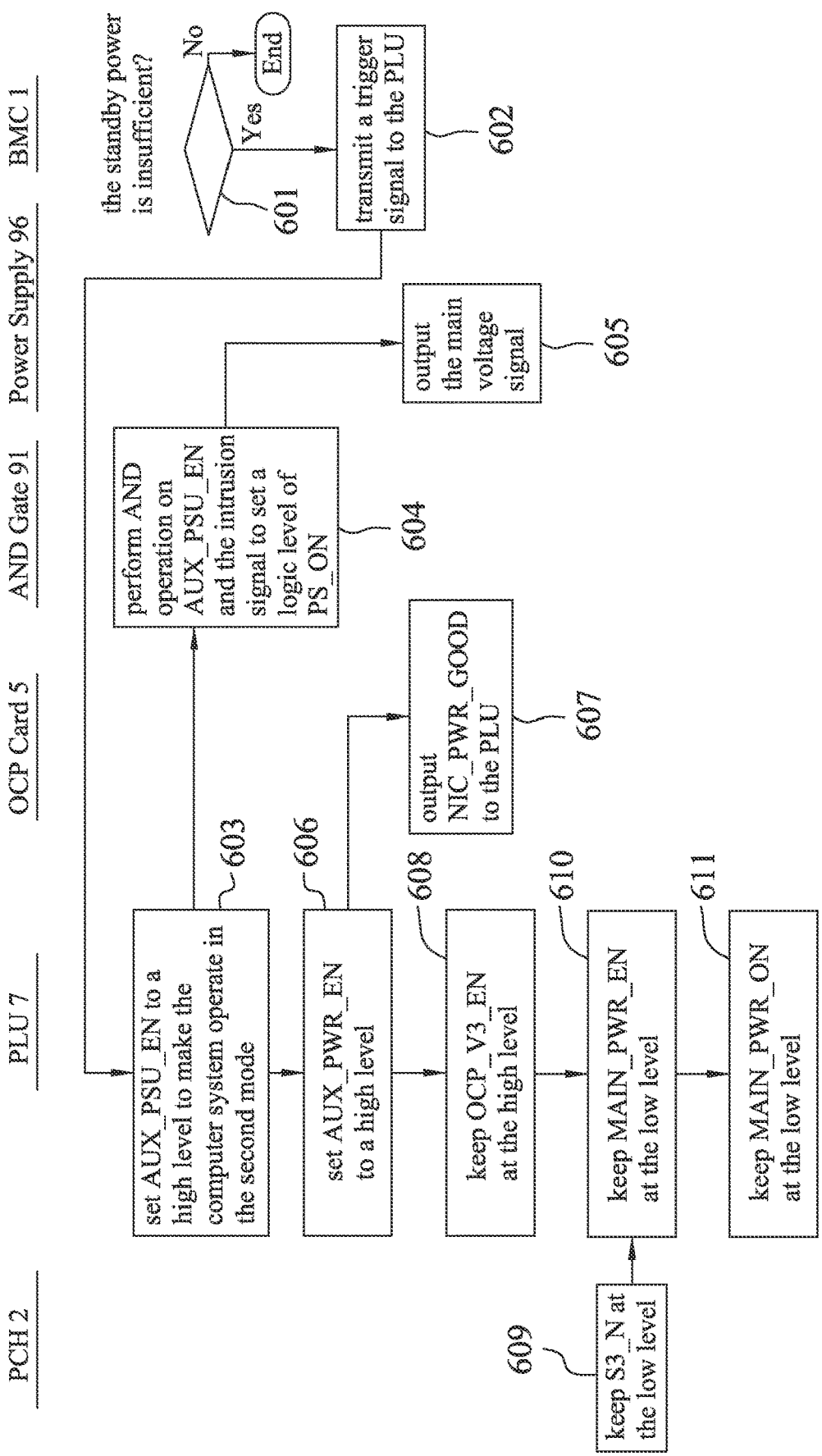
FIG. 6 is a flow chart of a second procedure of the method of supplying electric power to the computer system in the second mode.

Referring to FIGS. 5 and 6, the second procedure of the method of supplying electric power to the computer system in the second mode (AUX power mode) includes steps 601-611.

In step 601, when the computer system is in the first mode, the BMC 1 obtains card data from the OCP card 5, and determines whether the standby power provided by the PSU 9 in the first mode is insufficient according to the card data. The card data is stored in, for example, the field-replaceable unit (FRU) of the OCP card 5, and includes an electric power value of electric power that the OCP card 5 requires. The BMC 1 obtains the card data by accessing the FRU, and determines whether the standby power is insufficient by determining whether the electric power value is greater than a preset threshold value. When it is determined that the electric power value is greater than the preset threshold value, it means that the standby power is insufficient and the flow proceeds to step 602. When it is determined that the electric power value is not greater than the preset threshold value, it means that the standby power is sufficient and the second procedure is terminated.

It should be noted that when the BMC 1 determines that the standby power is sufficient, the computer system operates in a general standby procedure. Since the general standby procedure is well known in the art and is not the main feature of this disclosure, details thereof are omitted herein for the sake of brevity.

In step 602, the BMC 1 transmits a trigger signal to the PLU 7. Upon receiving the trigger signal, the PLU 7 makes the computer system operate in the second mode and controls the PSU 9 to provide the main power to the computer system.

Specifically, in step 603, the PLU 7 sets the pre-activating signal (AUX_PSU_EN) to a high level indicating that the main power is to be activated and transmits the pre-activating signal (AUX_PSU_EN) to the AND gate 91 so as to make the computer system operate in the second mode. Then, in step 604, the AND gate 91 performs AND operation on the pre-activating signal (AUX_PSU_EN) and the intrusion signal so as to set the logic level of the power-supply signal (PS_ON), and transmits the power-supply signal (PS_ON) to the power supply 96 and the first switch 92. When the computer system is in the second mode (the pre-activating signal (AUX_PSU_EN) is high) and the cover plate of the computer system is not removed (the intrusion signal is high), the AND gate 91 outputs the power-supply signal (PS_ON) having a high level so the main power is activated. Consequently, in step 605, in response to receipt of the power-supply signal (PS_ON) at the high level, the power supply 96 further outputs the main voltage signal (i.e., Vpsu=12V) so as to provide the main power greater than the standby power to the computer system. Further, in response to receipt of the power-supply signal (PS_ON) at the high level, the first switch 92 is triggered to provide the main voltage signal (Vpsu) to the first transformer 94 and the hot-swap controller 6 so as to supply electric power (i.e., the main power) to the BMC 1, the PCH 2, the PLU 7, the hot-swap controller 6 and the OCP card 5. As a result, the electric power provided to the OCP card 5 is sufficient.

In step 606, the PLU 7 further sets the standby-power supplying signal (AUX_PWR_EN) to a high level, and transmits the standby-power supplying signal (AUX_PWR_EN) to the OCP card 5 and the second switch 93. In response to receipt of the standby-power supplying signal (AUX_PWR_EN) at the high level, the second switch 93 is turned on so as to electrically connect the power supply 96 to the fan 8 to transmit the main voltage signal (Vpsu=12V) to the fan 8.

In step 607, upon receiving the standby-power supplying signal (AUX_PWR_EN) at the high level, the OCP card 5 outputs the power-state signal (NIC_PWR_GOOD) to the PLU 7. At this time, the OCP card 5 may set the power-state signal (NIC_PWR_GOOD) to a high level indicating that the electric power supplied to the OCP card 5 is stable.

In step 608, when the computer system operates in the second mode, the PLU 7 further keeps the card-activating signal (OCP_V3_EN) at the high level indicating that the OCP card 5 is activated, and then transmits the card-activating signal (OCP_V3_EN) to the hot-swap controller 6.

In step 609, the PCH 2 keeps the state signal (S3_N) at the low level indicating that the computer system is not booting, and then transmits the state signal (S3_N) to the PLU 7.

In step 610, upon receiving the state signal (S3_N), the PLU 7 keeps the main-power supplying signal (MAIN_PWR_EN) at the low level and then transmits the main-power supplying signal (MAIN_PWR_EN) to the OCP card 5 in response to the state signal (S3_N) at the low level.

In step 611, in response to the state signal (S3_N) being at the low level, the PLU 7 further keeps the main-power signal (MAIN_PWR_ON) at the low level and then transmits the main-power signal (MAIN_PWR_ON) to the second transformer 95. In response to the main-power signal (MAIN_PWR_ON) being at the low level, the second transformer 95 does not provide the main power to the CPU 3 and the memory unit 4 (i.e., not providing the main voltage signal (Vpsu) to the CPU 3 and the memory unit 4).

It should be noted that steps 606-611 does not have to be implemented in the specific order as shown in FIG. 6, and may be implemented simultaneously or implemented in any order according to requirement.

Figure 7:
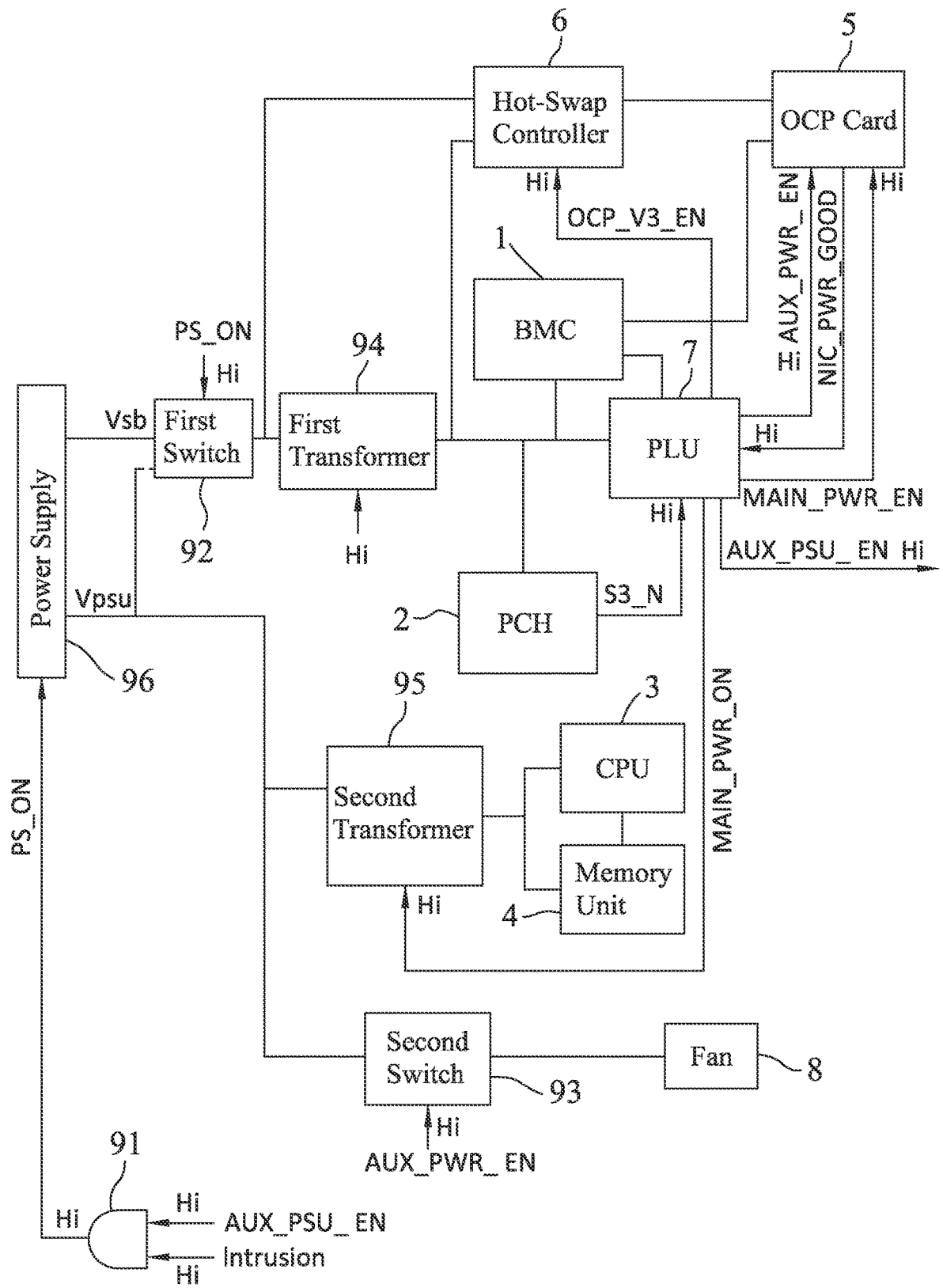
FIG. 7 is a block diagram of the computer system for illustrating states of the signals in a third mode.
Figure 8:
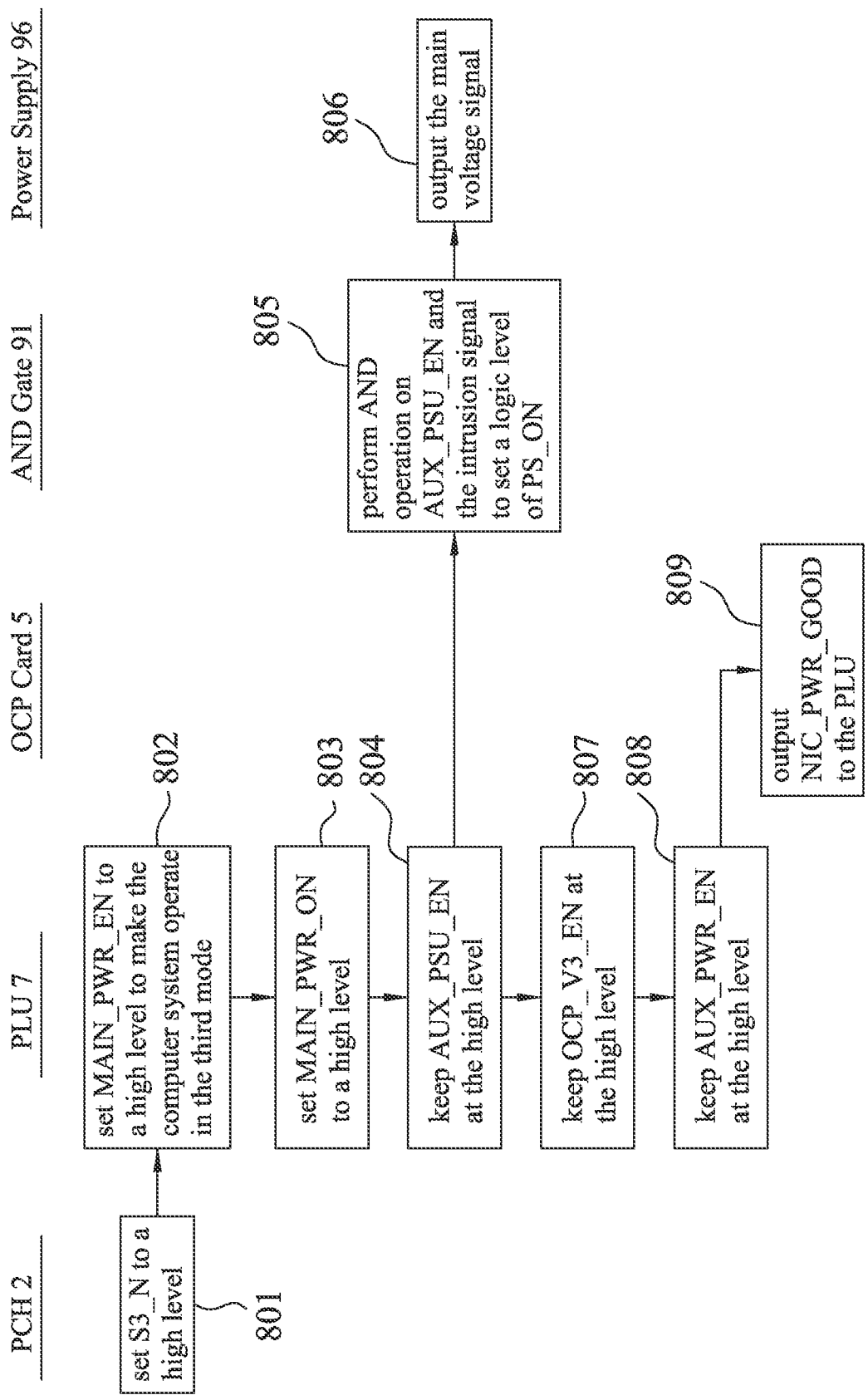
FIG. 8 is a flow chart of a third procedure of the method of supplying electric power to the computer system in the third mode.

Referring to FIGS. 7 and 8, the third procedure of the method of supplying electric power to the computer system in the third mode (main power mode) includes steps 801-809.

In step 801, upon receiving a booting signal, the PCH 2 sets the state signal (S3_N) to a high level indicating that the computer system is booting (i.e., entering a booting stage), and transmits the state signal (S3_N) to the PLU 7. For example, the booting signal is generated and outputted by the power button of the computer system when the power button is pressed, or is received from a remote end (e.g., a remote control, a remote device, etc.) communicating with the computer system. When the PCH 2 receives the booting signal, the computer system wakes up from the standby state and enters the booting stage so as to boot; without receiving the booting signal, the computer system is kept in the standby state.

In step 802, upon receiving the state signal (S3_N), the PLU 7 sets the main-power supplying signal (MAIN_PWR_EN) to a high level in response to the state signal (S3_N) being at the high level, and transmits the main-power supplying signal (MAIN_PWR_EN) to the OCP card 5 so as to make the computer system operate in the third mode.

In step 803, in response to the state signal (S3_N) being at the high level, the PLU 7 further sets the main-power signal (MAIN_PWR_ON) to a high level and then transmits the main-power signal (MAIN_PWR_ON) to the second transformer 95. In response to the main-power signal (MAIN_PWR_ON) being at the high level, the second transformer 95 transfers the main voltage signal (Vpsu=12V) to the CPU 3 and the memory unit 4 so as to provide the main power to the CPU 3 and the memory unit 4.

In step 804, when the computer system is in the third mode, the PLU 7 further keeps the pre-activating signal (AUX_PSU_EN) at the high level and transmits the pre-activating signal (AUX_PSU_EN) to the AND gate 91.

In step 805, the AND gate 91 performs AND operation on the pre-activating signal (AUX_PSU_EN) and the intrusion signal so as to set the logic level of the power-supply signal (PS_ON), and transmits the power-supply signal (PS_ON) to the power supply 96 and the first switch 92. When the computer system is in the third mode (the pre-activating signal (AUX_PSU_EN) is high) and the cover plate of the computer system is not removed (the intrusion signal is high), the AND gate 91 outputs the power-supply signal (PS_ON) having the high level so the main power remains activated.

Consequently, in step 806, in response to receipt of the power-supply signal (PS_ON) at the high level, the power supply 96 further outputs the main voltage signal (i.e., Vpsu=12V) so as to provide the main power, which is greater than the standby power, to the computer system. Further, in response to receipt of the power-supply signal (PS_ON) at the high level, the first switch 92 is triggered to provide the main voltage signal (Vpsu) to the first transformer 94 and the hot-swap controller 6 so as to supply electric power (i.e., the main power) to the BMC 1, the PCH 2, the PLU 7, the hot-swap controller 6 and the OCP card 5.

In step 807, when the computer system is in the third mode, the PLU 7 further keeps the card-activating signal (OCP_V3_EN) at the high level indicating that the OCP card 5 is activated, and then transmits the card-activating signal (OCP_V3_EN) to the hot-swap controller 6.

In step 808, when the computer system is in the third mode, the PLU 7 further keeps the standby-power supplying signal (AUX_PWR_EN) at the high level, and transmits the standby-power supplying signal (AUX_PWR_EN) to the OCP card 5 and the second switch 93. In response to receipt of the standby-power supplying signal (AUX_PWR_EN) at the high level, the second switch 93 is turned on so as to maintain transmission of the main voltage signal (Vpsu=12V) to the fan 8.

In step 809, when the computer system is in the third mode, the OCP card 5 keeps the power-state signal (NIC_PWR_GOOD) at the high level indicating that the electric power supplied to the OCP card 5 is stable, and transmits the power-state signal (NIC_PWR_GOOD) to the PLU 7.

It should be noted that steps 803-809 does not have to be implemented in the specific order as shown in FIG. 8, and may be implemented simultaneously or implemented in any order according to requirement.

It should be noted that, in FIGS. 3, 5 and 7, a dashed line between two components means that no voltage signal is being transmitted between these two components, and a signal transmitted to the first transformer 94 is always set to a high level (indicated by "Hi").

In summary, in the method of supplying electric power to the computer system, the BMC 1 transmits the trigger signal to the PLU 7 when determining that the standby power is insufficient, so that the PLU 7 controls the PSU 9 to provide the main power, which is greater than the standby power, to the OCP card 5 in the second mode in advance, instead of providing the main power only in the main power mode (i.e., the computer system is booted up). In the method of this disclosure, even though the main power is provided at an earlier stage of the second mode, the standby-power supplying signal (AUX_PWR_EN), the main-power signal (MAIN_PWR_ON) and the power-state signal (NIC_PWR_GOOD) are all in compliance with the specification provided by the OCP, and the power-up sequence (see FIG. 2) is also in compliance with the specification provided by the OCP. Therefore, the method of this disclosure is compatible with the specification of the OCP, and can supply sufficient electric power to a computer system in compliance with the specification of the OCP. In addition, the power supply 96 can be embodied using a general power supply commonly used in a computer system, and there is no need to design or customize a special power supply capable of providing standby power with a relatively greater electric current. As a result, the cost of designing and manufacturing a special power supply and the cost of applying safety certification of the newly designed power supply will not be incurred, and the schedule of designing and developing a new computer system can be sped up.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method of supplying electric power to a computer system that is compliant with specification provided by the Open Compute Project (OCP), the computer system being configured to first operate in a first mode and then, when the computer system enters a standby state, in a second mode that requires more electric power than the first mode, the computer system including a baseboard management controller (BMC), an OCP card, a programmable logic unit (PLU) that is electrically connected to the BMC and the OCP card, and a power supply unit (PSU) that supplies electric power to the BMC, the OCP card and the PLU, the method comprising steps of:

setting, by the PLU, a card-activating signal (OCP_V3_EN) to a high level so as to make the computer system operate in the first mode, the card-activating signal (OCP_V3_EN) being related to activation of the OCP card;

obtaining, by the BMC, card data that is related to the OCP card from the OCP card when the computer system operates in the first mode;

determining, by the BMC, whether standby power provided by the PSU in the first mode is sufficient according to the card data;

transmitting, by the BMC, a trigger signal to the PLU when it is determined that the standby power is not sufficient; and by the PLU, upon receiving the trigger signal, making the computer system operate in the second mode, and controlling the PSU to provide main power that is greater than the standby power to the OCP card when the computer system operates in the second mode.

2. The method of claim 1, wherein in the step of obtaining card data, the card data includes an electric power value of electric power that the OCP card requires, the step of determining whether standby power provided by the PSU in the first mode is sufficient includes the BMC determining whether the standby power is insufficient by determining whether the electric power value is greater than a preset threshold value.

3. The method of claim 1, wherein the first mode is an ID mode and the second mode is an AUX power mode.

4. The method of claim 1, wherein the step of controlling the PSU to provide main power includes sub-steps of the PLU setting a pre-activating signal (AUX_PSU_EN) related to supply of the main power to a high level, and transmitting the pre-activating signal (AUX_PSU_EN) to the PSU so as to enable the PSU to provide the main power.

5. The method of claim 4, the PSU including an AND gate including an AND gate, a first switch electrically connected to the AND gate, and a power supply electrically connected to the AND gate and the first switch, wherein the method further comprises:

the AND gate performing AND operation on the pre-activating signal (AUX_PSU_EN) and an intrusion signal that is at a high level to indicate a cover plate of the computer system is not removed, so as to set a power-supply signal (PS_ON) indicating whether to supply the main power to a high level;

the AND gate transmitting the power-supply signal (PS_ON) to the power supply and the first switch; and in response to receipt of the power-supply signal (PS_ON) at the high level, the power supply outputting main voltage signal so as to provide the main power to the computer system.

6. The method of claim 1, the computer system further including a fan, the PSU further providing electric power to the fan, wherein the method further comprises:

after the step of making the computer system operate in the second mode, the PLU setting a standby-power supplying signal (AUX_PWR_EN) related to supply of the standby power to a high level, and transmitting the standby-power supplying signal (AUX_PWR_EN) to the PSU so as to enable the PSU to provide electric power to the fan when the computer system operates in the second mode.

7. The method of claim 6, the computer system further including a platform control hub (PCH) that is electrically connected to the PLU, a central processing unit (CPU), and a memory unit electrically connected to the CPU, the PSU further providing electric power to the PCH, wherein the method further comprises, when the computer system operates in the second mode:

the PLU keeping the card-activating signal (OCP_V3_EN) at the high level indicating that the OCP card is activated;

the PCH setting a state signal (S3_N) to a low level indicating that the computer system does not enter a booting stage and transmitting the state signal (S3_N) to the PLU;

upon receiving the state signal (S3_N) at the low level, the PLU setting a main-power supplying signal (MAIN_PWR_EN) related to supply of the main power at a low level, and then transmitting the main-power supplying signal (MAIN_PWR_EN) to the OCP card;

in response to the state signal (S3_N) being at the low level, the PLU further setting a main-power signal (MAIN_PWR_ON) indicating whether to supply the main power to a low level and then transmitting the main-power signal (MAIN_PWR_ON) to the PSU so as to enable the PSU not to provide the main power to the CPU and the memory unit.

8. The method of claim 1, further comprising:

before the step of setting a card-activating signal (OCP_V3_EN) to a high level, the BMC sending a notification signal to the PLU when the BMC detects that the computer system includes the OCP card, wherein, in the step of setting a card-activating signal (OCP_V3_EN) to a high level, the PLU sets the card-activating signal (OCP_V3_EN) to the high level upon receipt of the notification signal.

9. The method of claim 1, further comprising:

after the step of making the computer system operate in the second mode, the OCP card indicating that electric power supplied to the OCP card is stable by setting a power-state signal (NIC_PWR_GOOD) indicating whether the electric power supplied to the OCP card is stable to a high level when said computer system operates in the second mode.

10. The method of claim 1, the computer system further including a platform control hub (PCH) that is electrically connected to the PLU, the PSU further providing electric power to the PCH, wherein the method further comprises, after the step of controlling the PSU to provide main power:
when the computer system enters a booting stage, the PCH setting a state signal (S3_N) indicating whether the computer system enters the booting stage to a high level and sending the state signal (S3_N) to the PLU.

11. The method of claim 10, further comprising, after the step of sending the state signal (S3_N) to the PLU:
upon receiving the state signal (S3_N), the PLU setting a main-power supplying signal (MAIN_PWR_EN) related to supply of the main power to a high level so as to make the computer system operate in a third mode, in which the OCP card operates in full capacity.

12. The method of claim 11, further comprising:
upon receiving the state signal (S3_N), the PLU setting a main-power signal (MAIN_PWR_ON) indicating whether to supply the main power to a high level, and transmitting the main-power signal (MAIN_PWR_ON) to the PSU to enable the PSU to provide the main power required in the booting stage.

13. The method of claim 12, the PSU including an AND gate including an AND gate, a first switch electrically connected to the AND gate, and a power supply electrically connected to the AND gate and the first switch, wherein the method further comprises, when the computer system is in the third mode:
the PLU setting a pre-activating signal (AUX_PSU_EN) related to supply of the main power to a high level and transmitting the pre-activating signal (AUX_PSU_EN) to the AND gate;
the AND gate performing AND operation on the pre-activating signal (AUX_PSU_EN) and an intrusion signal that is at a high level to indicate a cover plate of the computer system is not removed, so as to set a power-supply signal (PS_ON) indicating whether to supply the main power to a high level;
the AND gate transmitting the power-supply signal (PS_ON) to the power supply and the first switch;
in response to receipt of the power-supply signal (PS_ON) at the high level, the power supply outputting a main voltage signal so as to provide the main power to the computer system.

14. The method of claim 13, the computer system further including a fan, the PSU further providing electric power to the fan, wherein the method further comprises, when the computer system is in the third mode:
the PLU keeping the card-activating signal (OCP_V3_EN) at the high level indicating that the OCP card is activated;
the PLU setting a standby-power supplying signal (AUX_PWR_EN) related to supply of the standby power at a high level, and transmitting the standby-power supplying signal (AUX_PWR_EN) to the OCP card and the PSU;
in response to receipt of the standby-power supplying signal (AUX_PWR_EN) at the high level, the PSU providing the main voltage signal to the fan.

15. The method of claim 11, further comprising, when the computer system is in the third mode, the OCP card a power-state signal (NIC_PWR_GOOD) at a high level indicating that the electric power supplied to the OCP card is stable, and transmitting the power-state signal (NIC_PWR_GOOD) to the PLU.

16. The method of claim 1, the computer system further including a central processing unit (CPU), and a memory unit electrically connected to the CPU,
wherein in the step of controlling the PSU to provide main power, the PSU does not provide the main power to the CPU and the memory unit when the computer system operates in the second mode.

17. The method of claim 1, the computer system further including a platform control hub (PCH) that is electrically connected to the PLU, a central processing unit (CPU), and a memory unit electrically connected to the CPU, the PSU further providing electric power to the PCH, wherein the method further comprises, when the computer system operates in the first mode:
the PCH setting a state signal (S3_N) to a low level indicating that the computer system does not enter a booting stage, and then transmitting the state signal (S3_N) to the PLU;
upon receiving the state signal (S3_N) at the low level, the PLU setting a main-power supplying signal (MAIN_PWR_EN) related to supply of the main power to a low level and then transmitting the main-power supplying signal (MAIN_PWR_EN) to the OCP card;
in response to the state signal (S3_N) being at the low level, the PLU further setting a main-power signal (MAIN_PWR_ON) indicating whether to supply the main power at a low level and then transmitting the main-power signal (MAIN_PWR_ON) to the PSU so as to enable the PSU not to provide the main power to the CPU and the memory unit.

18. The method of claim 1, the PSU including an AND gate including an AND gate, a first switch electrically connected to the AND gate, and a power supply electrically connected to the AND gate and the first switch, wherein the method further comprises, when the computer system operates in the first mode:
the PLU further setting a pre-activating signal (AUX_PSU_EN) to a low level indicating that the main power is not to be activated and transmitting the pre-activating signal (AUX_PSU_EN) to the AND gate;
the AND gate performing AND operation on the pre-activating signal (AUX_PSU_EN) and an intrusion signal that is at a high level to indicate a cover plate of the computer system is not removed so as to set the power-supply signal (PS_ON) to a low level;
the AND gate transmitting the power-supply signal (PS_ON) to the power supply and the first switch; and
in response to receipt of the power-supply signal (PS_ON) at the low level, the power supply only outputting the standby power.

19. The method of claim 18, the computer system further including a fan, the PSU further providing electric power to the fan, wherein the method further comprises, when the computer system is in the first mode:
the PLU setting a standby-power supplying signal (AUX_PWR_EN) related to supply of the standby power to a low level, and transmitting the standby-power supplying signal (AUX_PWR_EN) to the OCP card and the PSU so as to not provide electric power to the fan.

* * * * *